(No Model.) W. H. BROMLEY & P. J. GATELY.
CRACKER MACHINE.
No. 323,848. Patented Aug. 4, 1885.
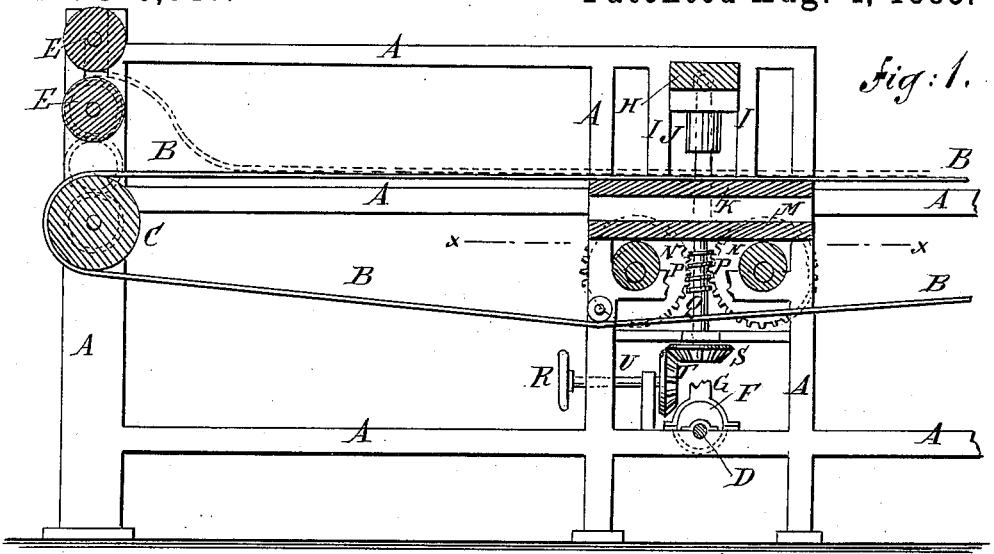
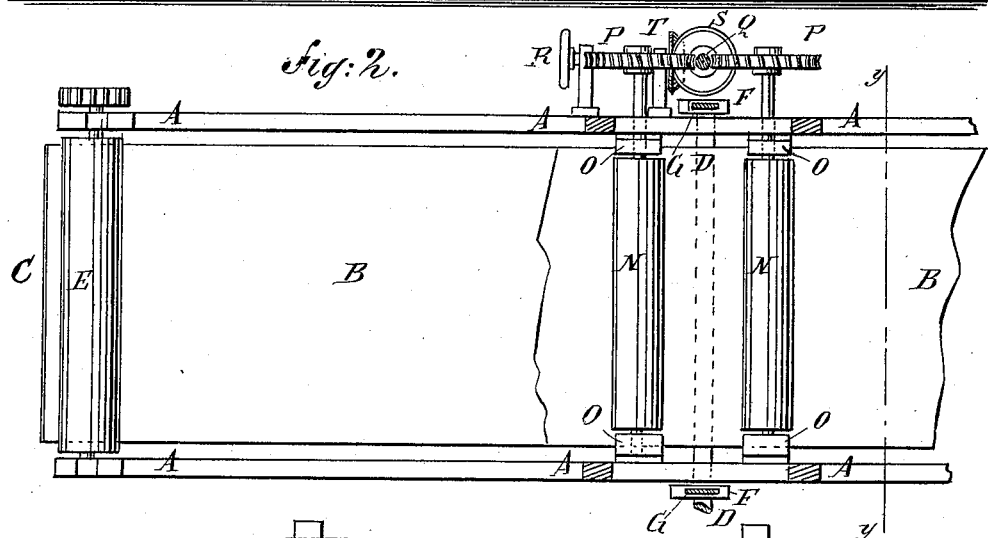
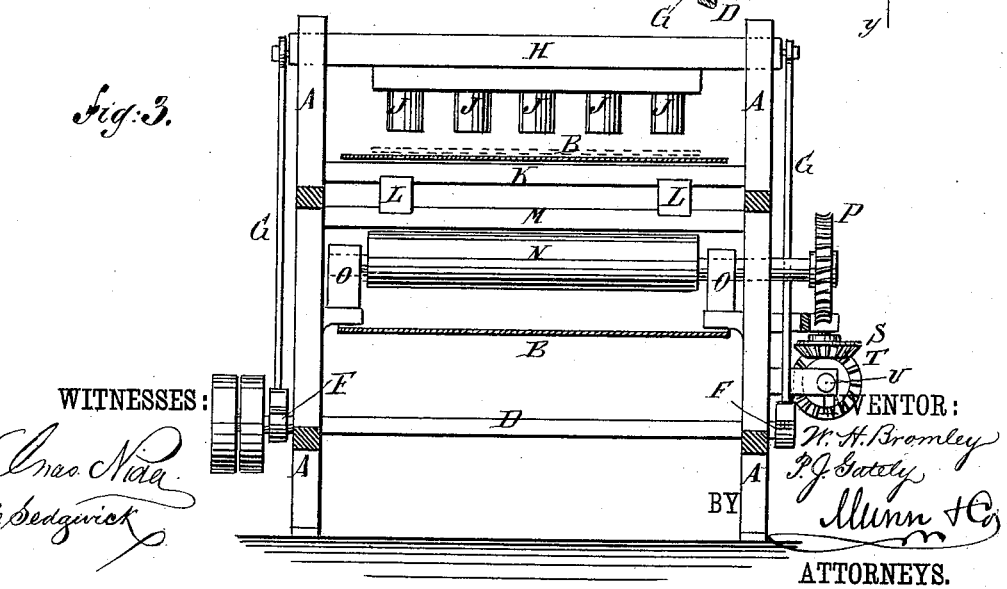
WITNESSES:
INVENTOR:
W. H. Bromley
P. J. Gately
BY Munn & Co.
ATTORNEYS.

UNITED STATES PATENT OFFICE.

WILLIAM H. BROMLEY AND PHILIP J. GATELY, OF BROOKLYN, NEW YORK.

CRACKER-MACHINE.

SPECIFICATION forming part of Letters Patent No. 323,848, dated August 4, 1885.

Application filed March 19, 1885. (No model.)

*To all whom it may concern:*

Be it known that we, WILLIAM H. BROMLEY and PHILIP J. GATELY, of Brooklyn, in the county of Kings and State of New York, have invented a new and useful Improvement in Cracker-Machines, of which the following is a full, clear, and exact description.

Reference is to be had to the accompanying drawings, forming a part of this specification, in which similar letters of reference indicate corresponding parts in all the figures.

Figure 1 is a sectional side elevation of a part of a cracker-machine to which our improvement has been applied, part being broken away. Fig. 2 is a plan view of a part of the same, partly in section, through the line x x, Fig. 1. Fig. 3 is a sectional end elevation of the same, taken through the line y y, Fig. 2.

The object of this improvement is to provide cracker-machines constructed in such a manner that the bed-plate can be readily adjusted as the desired thickness of the sheet of dough or the wear of the cutters may require.

The invention relates to a cracker-machine constructed with its elastic bed-plate resting upon two eccentric rollers, so that by turning the said rollers the bed-plate can be adjusted with accuracy. The two eccentric rollers are provided with worm-wheels and a worm, so that the said eccentric rollers can be readily operated, as will be hereinafter fully described, and then claimed.

A represents the frame of a cracker-machine. B is the endless apron by which the sheet of dough is carried to the cutters, and which passes around rollers C, one of which is shown in Figs. 1 and 2, journaled to the ends of the frame A. Motion is given to the roller C from the drive-shaft D by gearing which is not shown in the drawings, as there is nothing new in its construction.

E are the feed-rollers from which the sheet of dough passes to the endless apron B, and which are driven from the roller C by a chain of gear-wheels, as indicated in dotted lines in Fig. 1.

To the drive shaft D are attached eccentrics F, with which are connected the lower ends of the rods G. The upper ends of the rods G are pivoted to the ends of the head-block H, which moves up and down between guides I, attached to the frame A, and carries the cutters J.

The part of the endless apron B upon which the cutting is done rests upon the bed-plate K, supported by rubber blocks L, to give it the necessary elasticity. The rubber blocks L rest upon a plate, M, which rests upon the faces of the eccentric rollers N, journaled in bearings O, attached to the frame A. The journals of the eccentric rollers N, at one side of the frame A, project, and to them are attached worm-wheels P, which mesh into a worm, Q, journaled in bearings attached to the frame A. The worm Q can be placed between the worm-wheels P, as illustrated in the drawings, or it can be placed beneath the said worm-wheels, as may be desired or convenient. The worm Q can be operated by a hand-wheel, R, attached to its end or connected with it by beveled gear-wheels S T and a shaft, U, as the construction of the machine may render most convenient. The latter arrangement is illustrated in the drawings. With this construction, by turning the worm Q the worm-wheels P and the eccentric rollers N will be turned to raise or lower the elastic bed-plate K L M, as the thickness of the sheet of dough or the wear of the cutters may require.

A special advantage of this construction is that all parts of the bed-plate will be raised or lowered through exactly the same space, so that the said bed-plate will always be level, and thus always in position for the cutters to operate properly upon it.

We are aware that elastic beds or plates in cracker-machines have heretofore been known, and elevated and lowered by means of a yoke and a single eccentric roller. We employ two eccentric rollers, operated in opposite direction and resting immediately under the platen, without the intervention of yoke or bridge, and by this means we are enabled to operate the bed or plate so as to avoid all side strain upon it, and also distribute the wear of the roller over its whole surface. As already explained, the two worm-wheels P are operated by the single worm O, which necessarily causes them to be rotated in opposite directions, and this will tend to hold the bed or platen against any side strain in the sides of the frames, as the action of one roller in carrying or forcing it in one direction is overcome by the action of the other, operating in the opposite direction, when they are turned. This construction also affords a positive support under each side of the table, and prevents any tendency to rock or move, as would be the case with a single roller, unless the table or bed be held in ways so tight as to make it difficult to move it. This construction also enables us to dispense with the yoke, and makes the machine more compact. It also renders the table entirely independent of the rollers. The rollers, by bearing under the table their entire length, have just the same wear upon them at one point as at another, and the liability to become worn unevenly at different points in their length is obviated.

Having thus fully described our invention, we claim as new and desire to secure by Letters Patent—

In a cracker-machine, the combination, with the bed or plate over which the apron passes and upon which the cutting is done, of two eccentric rollers mounted under said bed and bearing directly against it their entire length, but not connected with said plate or bed, worm-wheels on the shafts of said eccentric rollers, and a single worm for turning both wheels and rollers, whereby they are revolved in opposite directions, as shown, and for the purposes set forth.

WILLIAM H. BROMLEY.
PHILIP J. GATELY.

Witnesses:
 JAMES T. GRAHAM,
 C. SEDGWICK.